United States Patent [19]

Berman et al.

[11] 4,235,525
[45] Nov. 25, 1980

[54] LIQUID CRYSTAL DISPLAY CELL HAVING A LIGHT FIELD BACKGROUND

[75] Inventors: Arthur L. Berman, Brea; Gordon Kramer, Huntington Beach, both of Calif.

[73] Assignee: Beckman Instruments, Inc., Fullerton, Calif.

[21] Appl. No.: 36,619

[22] Filed: May 7, 1979

[51] Int. Cl.³ .............................................. G02F 1/137
[52] U.S. Cl. ................................ 350/339 R; 350/349
[58] Field of Search ............... 350/344, 349, 339 R, 350/336

[56] References Cited

U.S. PATENT DOCUMENTS

| | | | |
|---|---|---|---|
| 3,704,056 | 11/1972 | Wysocki et al. | 350/344 X |
| 3,712,047 | 1/1973 | Girard | 350/345 X |
| 3,932,026 | 1/1976 | Sprokel | 350/339 R |
| 3,978,580 | 9/1976 | Leupp et al. | 350/344 X |
| 4,050,786 | 9/1977 | Feldman | 350/344 |

FOREIGN PATENT DOCUMENTS

| | | | |
|---|---|---|---|
| 1336254 | 11/1973 | United Kingdom | 350/344 |
| 1350601 | 4/1974 | United Kingdom | 350/344 |

*Primary Examiner*—Edward S. Bauer
*Attorney, Agent, or Firm*—R. J. Steinmeyer; William H. May

[57] ABSTRACT

The instant invention is a light field liquid crystal display cell with a seal and pattern layer applied to the cell substrates. Dark segments are displayed against a lighter background. Polymeric substances can be used to space and seal the cell substrates, and the light field background is created without masking the cell substrates.

7 Claims, 8 Drawing Figures

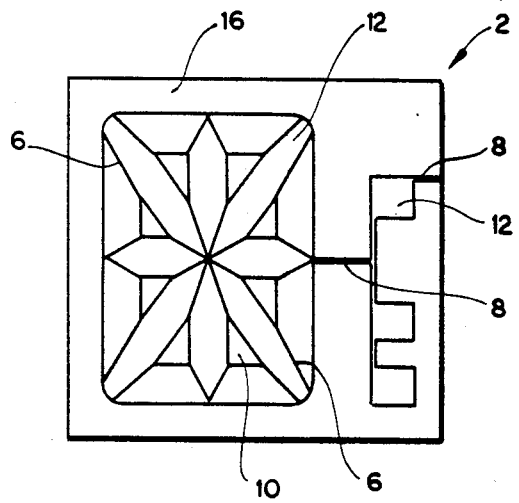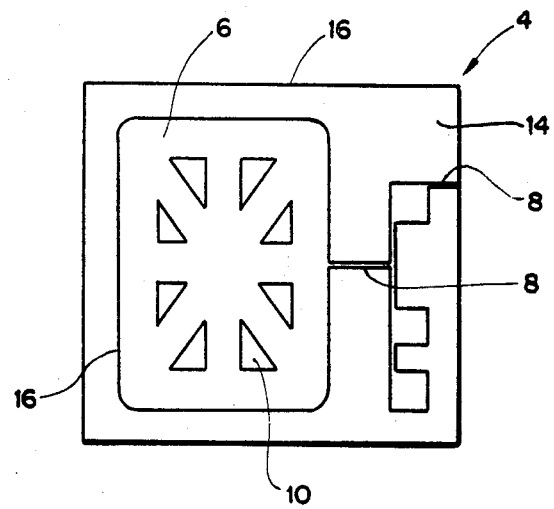
FIG. 2　　　　FIG. 3
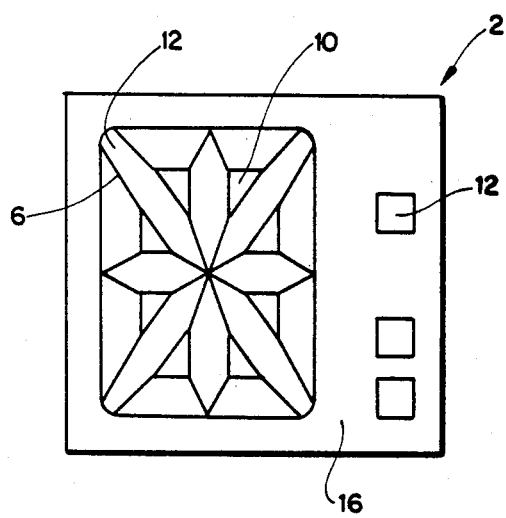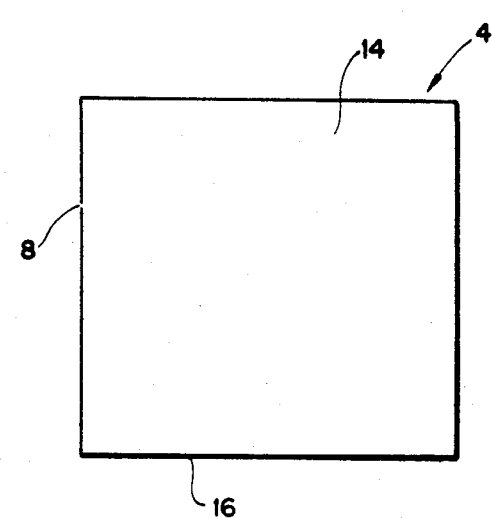
FIG. 5　　　　FIG. 6

LIQUID CRYSTAL DISPLAY CELL HAVING A LIGHT FIELD BACKGROUND

BACKGROUND OF THE INVENTION

This invention relates to liquid crystal display cells, and more particularly to liquid crystal displays having a light field background with dark displayed characters.

Liquid crystal displays do not emit light. Instead such displays rely on outside illumination transmitted through or reflected off of the device. Problems have been encountered with maintaining consistent spacing between cathode and anode electrodes in liquid crystal display cells. Without consistent spacing, clarity of displayed characters is limited. In order to assure easier readability of liquid crystal displays, it is desirable that the background of the display be relatively light and the characters be dark.

U.S. Pat. No. 4,050,786, Feldman, provides particulate inorganic spacers to achieve uniform spacing between adjacent substrates for liquid crystal displays. Feldman in column 1, line 66 describes his structure as follows: "In exemplary preferred embodiments of the present invention a liquid crystal display is indicated for hermetically containing an electro-optic fluid, such as a nematic liquid crystal, between selectively energized electrical contacts that are regulated in spacing over large areas to provide a controlled potential gradient through the electro-optic fluid, and to eliminate short circuits." Continuing in column 2, line 10: "The conducting surfaces of the substrate are secured in a face-to-face relationship with a spacing provided by a first frit of normally non-transparent glass particles fused to one of the substrates. A denser second frit is deposited on one substrate in a pattern surrounding, but not entering, the pattern formed by the face-to-face electrical conductors and is subsequently fused together and to both substrates bonding them and providing a hermetic seal. An electrooptic fluid, such as a nematic liquid crystal, is selected with a refractive index matching that of the first frit, and is caused to flow into the region surrounding the first frit in positions bounded by the second frit. The fluid frit boundary becomes invisible due to the matched indexes of refraction." While Feldman provides structure for spacing the substrates and sealing around the conductive segments between the substrates, the Feldman structure is not applicable to the preferred display structure designed to achieve a dark display on a light background. Additionally, the utilization of polymeric substances in place of Feldman's glass frits for the spacing and sealing is, as a practical matter, difficult to employ when the display cell is relatively large.

Displays in which the liquid crystal material is host to a guest dichroic dye are known in the art. Heilmeier and Zanoni describe the use of guest dyes as follows: "the orientation of a 'guest' dichroic dye (a dye whose optical absorption spectrum is a strong function of the polarization of the incident light with respect to the molecular orientation) is controlled by the orientation of its nematic host in an applied electric field." G. H. Heilmeier and L. A. Zanoni, App. Phys. Lett. 13, 91 (1968). Application of an electric field causes molecules having a general parallel orientation and a positive dielectric anisotropy to align perpendicular to the display cell walls, resulting in the liquid crystal and dye molecules absorbing less light. This appears as a relatively bright character against a darker background.

U.S. Pat. No. 4,128,313, Cole, Jr., et al., describes a light field background display in column 1, line 42 as follows: "In accordance with the invention, a dichroic liquid crystal display having relatively dark characters and a relatively light background is provided by treating at least one of a pair of cell electrodes, each supported upon a transparent substrate, in a manner to achieve a homeotropic alignment over the entire electrode area. Character segment areas are masked on the treated electrode by means of a patterned mask or a layer of photoresist, respectively suitably etched or developed to provide apertures over the character segment areas; a parallel-alignment film, of a suitable surfactant or obliquely deposited SiO, is fabricated upon the uncovered areas of the electrode . . . Upon application of a field between character segment electrodes, the parallel alignment is forced to the perpendicular alignment to 'extinguish' the character segment by changing the normally dark appearance thereof to the same bright appearance as the background areas." Thus Cole, Jr. provides a light field liquid crystal display but requires that the cell substrates be masked during processing. Masking of the cell substrates is necessary to provide a liquid crystal alignment layer causing parallel alignment of liquid crystal, dye molecules on the electrode segment areas, and a different alignment layer for causing perpendicular alignment on the non-electrode segment areas.

SUMMARY OF THE INVENTION

The present invention is a light field background liquid crystal display cell with a seal and pattern layer applied to the cell substrate. The instant invention does not require masking of the cell substrates to obtain the desired orientation of the liquid crystal, dye molecules, and can utilize polymeric substances to space and seal the cell substrates. This is accomplished by assembling first and second substrates formed of a transparent material, each of the substrates having inwardly facing surfaces arranged in coplanar relationship and spaced apart to provide a uniform space therebetween; at least one transparent electrode is formed on the inward facing surface of the second substrate; a plurality of transparent electrode segments are formed on the inward facing surface of the first substrate and facing the electrode on the second substrate; a transparent clear seal and pattern layer formed of electrically nonconducting material is disposed in the space between the substrates, the pattern layer forms a seal substantially around the periphery of the space leaving only a fill channel therethrough, the pattern layer forms open regions across the space between the electrode segment areas and forms thin background regions between the layer and the inwardly facing surface of one of the substrates, the thickness of the thin background regions is substantially less than the thickness of the open regions across the space between the electrode segment areas; a molecular director alignment layer is deposited on at least the portions of the electrodes not sealed by the pattern layer; a liquid crystal material and pleochroic dye mixture is confined by the pattern layer between the two substrates, the molecular orientation of the liquid crystal material and pleochroic dye is substantially ordered by the director alignment layer in the unenergized states so that the molecules of liquid crystal and dye material in the open regions between unenergized electrodes absorb light, thereby presenting a dark colored appearance in such open regions, and the molecules of liquid crystal and dye material in the thin background regions partially absorb light thereby presenting a lighter background color in these regions of the cell; and means for electrically energizing the electrode on the second substrate and for selectively energizing certain of the segment electrodes on the first substrate, causing the liquid crystal and dye molecules to be oriented in a manner to substantially transmit light through energized electrode segments, producing a light color substantially the same as that of the thin background regions containing only a thin layer of unenergized liquid crystal and pleochroic dye molecules.

DESCRIPTION OF THE DRAWINGS

FIG. 2 is a cross-sectional view of the first substrate in a first embodiment of the invention taken along the line 2—2 in FIG. 1;

FIG. 3 is a cross-sectional view of the second substrate in a first embodiment of the invention taken along the line 3—3 in FIG. 1;

FIG. 5 is a cross-sectional view of the first substrate illustrating a second embodiment of the invention taken along the line 5—5 in FIG. 4;

FIG. 6 is a cross-sectional view of the second substrate illustrating the second embodiment of the invention taken along the line 6—6 in FIG. 4;

DESCRIPTION OF THE PREFERRED EMBODIMENTS

Figure 1:
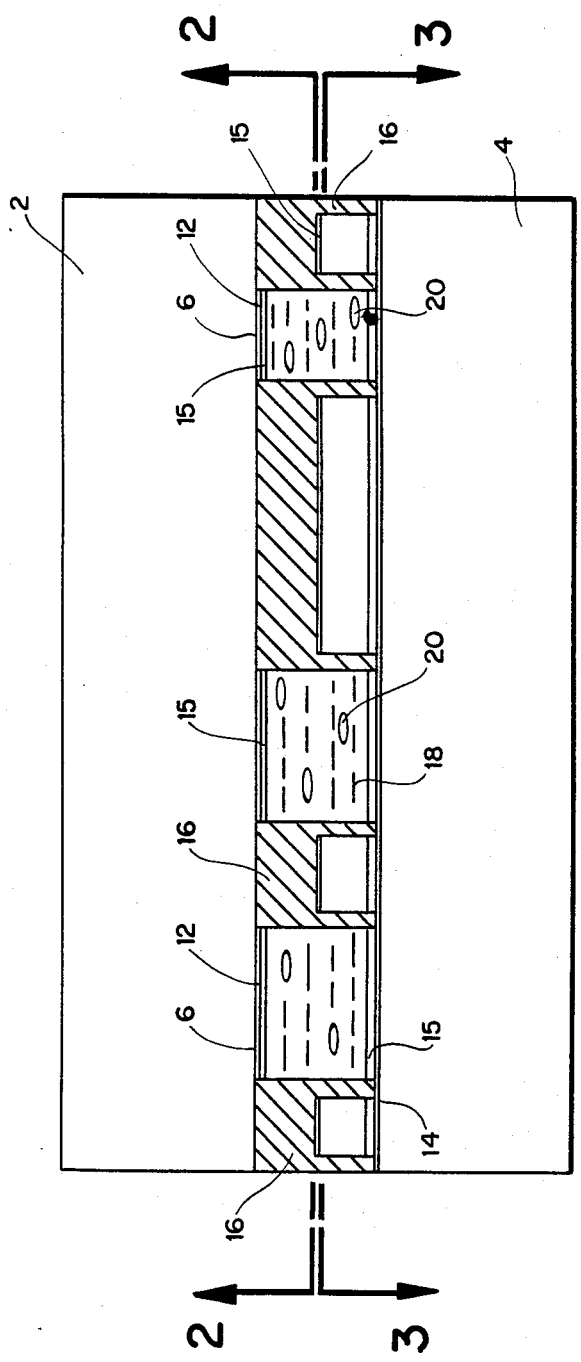
FIG. 1 is a cross-sectional view of a light field background liquid crystal cell.

FIG. 1 illustrates a preferred embodiment of the present invention, a light field background liquid crystal display cell. The cell comprises first and second substrates 2 and 4, arranged with the inward facing surfaces of the respective substrates positioned in a uniform spaced apart relationship. The substrates are formed of a substantially transparent material such as glass having extremely flat surfaces. A plurality of electrode segments 12 are applied to the inward facing surface of substrate 2, and a single electrode 14 is applied to the inward facing surface of substrate 4. In some instances it may be desirable to deposit a plurality of electrode segments to the surface of substrate 4 which are positioned directly opposite the electrodes on substrate 4 in place of the single electrode 14.

A seal and pattern layer 16 is disposed between the substrates 2 and 4, as shown in FIG. 1 in greatly exaggerated thickness for purposes of illustration. Pattern layer 16 is applied to the inward surface of substrate 2 to substantially surround the electrode segments 12, and additionally acts as a seal between the two substrates where the pattern layers 16 thereon overlap. Layer 16 may also be applied to substrate 4. Layer 16 should have physical and chemical properties that permit it to be screen printable on the substrates, have sufficient adhesiveness to adhere to the substrates, and be thixotropic.

Layer 16 is preferably comprised of a nonconductive polymeric material; however, inorganic materials may also be used. Specific examples of materials which may be utilized are polymeric material, such as NF-100 manufactured and sold by Thick Film Systems, Inc., and glass frits in the case of inorganics.

In a first embodiment of the invention, as shown in FIG. 2, seal and pattern layer 16 is applied to all areas of the inward facing surface of substrate 2, excluding electrode segment areas 6 and fill channels 8. Layer 16 is also applied to segment islands 10 which separate electrode segments 12 applied on electrode segment areas 6. FIG. 3 illustrates substrate 4 in the first embodiment. Pattern layer 16 is applied to segment islands 10 which correspond to segment islands 10 on substrate 2. Layer 16 is also applied to substrate 4 adjacent to and around the peripheries of the segment areas 6 corresponding to the electrode segment areas 6 on substrate 2 and to all peripheral areas of the inward surface of the substrate 4. This embodiment is more amenable for constructing large area displays compared to conventional perimeter-type seals. This is because layer 16 on the two substrates provides good structural support for the internal regions between the substrates and helps maintain the requisite spacing therebetween over large areas.

Liquid crystal molecules such as a cholesteric doped nematic liquid crystal or a nematic liquid crystal are coupled with a pleochroic dye and utilized in the invention. The molecules are confined between substrates 2 and 4 as illustrated in FIG. 1. Subsequent to sealing substrates 2 and 4 together, air is evacuated from the region of the cell formed within the joined substrates. The pleochroic dye utilized is a relatively dark color, e.g., dark blue.

In a second embodiment of the invention, as shown in FIG. 5, layer 16 is applied to all areas of the inward surface of substrate 2 except electrode segment areas 6. FIG. 6 shows substrate 4 in the second embodiment with layer 16 applied to the periphery of the inward surface except a fill channel 8.

In both embodiments described herein, layer 16 has a dual purpose. Layer 16 acts as a pattern surrounding electrode segments 12 on substrate 2, and also provides a seal for the two substrates at their outer periphery when they are joined. Also in the first embodiment, as shown in FIG. 1, the pattern layer also seals around the individual facing electrode regions.

A molecular director alignment layer 15, shown in FIG. 1, is also applied to the inward surfaces of the substrates for inducing parallel or perpendicular alignment of the elongated axis of both liquid crystal 18 and pleochroic dye molecules 20 confined between the joined substrates. The combined space time average axis of the longitudinal axis of the liquid crystal and pleochroic dye molecules 18 and 20 of the cell, as shown in FIG. 1, is termed the liquid crystal director. Alignment layer 15 aligns the liquid crystal director to improve the general molecular orientation within the cell regions. Alignment layer 15 may be applied either before or after pattern layer 16 has been applied to the substrates. Application of alignment layer 15 is accomplished either through organic or inorganic alignment techniques, well known in the art.

For parallel alignment, layer 15 creates grooves on the surface of the substrates which causes a thin layer of liquid crystal molecules nearest layer 15, and the bulk of liquid crystal molecules both to assume parallel orientations with respect to the substrate surfaces. For perpendicular alignment, layer 15 causes the thin layer of liquid crystal molecules nearest layer 15 to assume an essentially perpendicular orientation. However, the bulk of liquid crystal material beyond the thin layer has substantial parallel components with respect to the surfaces of the substrates. The perpendicular alignment has a faster turn off time than the parallel alignment and the perpendicular alignment reduces residual color compared to the parallel alignment. Alignment layer 15 may be, for example, a surfactant coating and be made of an organic or inorganic compound. Examples of organic compounds include polyvinyl alcohol and the general class of materials known as silanes, such as N,N-dimethyl-N-octadecyl-3-aminopropyltrimethoxysilyl chloride (DMOAP). An example of an inorganic compound would be SiO. In the case of perpendicular alignment, a cholesteric doped nematic liquid crystal is desired, and a nematic liquid crystal is preferred with parallel alignment. An example of a specific liquid crystal which could be employed is a cyano biphenyl mixture such as E7, provided by British Drug House.

Figure 8:
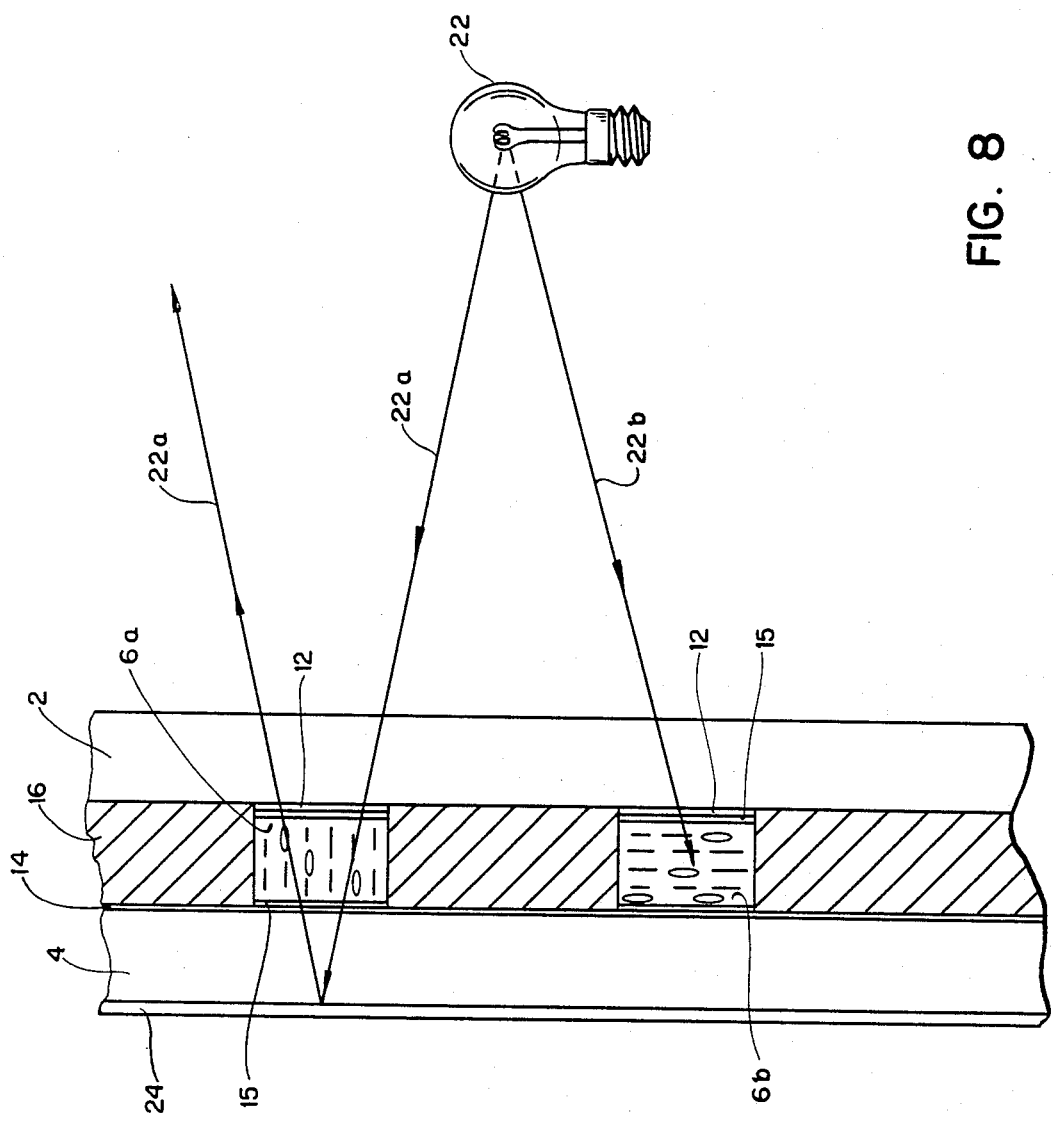
FIG. 8 is a cross-sectional view of a light background liquid crystal cell with a reflective member, showing an energized electrode segment and an unenergized segment.

Application of an electric field between corresponding electrodes 12 and 14 in segment areas 6a, as shown in FIG. 8, causes the liquid crystal and dye molecules' director with parallel orientation or having substantial parallel components to go to an essentially perpendicular orientation. In this example, segment 6b is unenergized and segment 6a is energized. A light ray 22a from light source 22 passes through segment area 6a, strikes reflective surface 24, and again passes through segment area 6a without being completely absorbed by the liquid crystal or dye molecules 18 and 20. Because the molecules in segment area 6a are in the perpendicular orientation, they do not absorb light ray 22a to any great extent and, thus, segment 6a appears as a relatively light color. As stated previously, segment 6b is unenergized. Because the segment is unenergized, the liquid crystal and dye molecules 18 and 20 have an essentially parallel orientation or substantial parallel components. In this orientation the molecules absorb light. Light ray 22b is thus absorbed by the dye molecules which make this segment appear much darker in color than energized segment 6a. As illustrated, a reflective display is shown. A transmissive display may also be employed without a reflector.

In the first embodiment of the invention, the seal and pattern layer 16 applied to substrate 2 is a light color but transparent, e.g., light blue, as shown in FIG. 2. The pattern layer 16 applied to substrate 4, as shown in FIG. 3, can be the same color as the pattern layer 16 applied to substrate 2 or it can be clear. When viewing the unenergized cell, pattern layer 16 forms the background and produces a light color, such as a light blue. The unenergized segment areas are the dark color of the pleochroic dye, since they absorb the light and the dye produces a dark color, e.g., dark blue. Application of a predetermined voltage between certain electrode segments 12 and electrode 14 causes the liquid crystal, dye molecules in the parallel orientation or having substantial parallel components to go to the perpendicular orientation. The energized segments then appear to be essentially the same color as pattern layer 16 because the dye molecules have absorbed little light in this orientation. To display a character, unwanted segments are energized, as illustrated in FIG. 6. In FIG. 6, the number 7 is displayed by energizing all electrodes except 12b, c, d, and e. The number 7 would be displayed as a dark character against a relatively light background.

For each fill channel 8, as shown in FIGS. 2 and 3, there is an electrode (not shown). The electrodes for fill channels 8 are always energized so that the fill channels, which contain liquid crystal and dye, are always rendered indistinguishable from the background during operation of the display. That is, because they are continuously energized, this region always permits light to pass substantially unabsorbed by the dye molecules, thereby always assuming the light background color.

Figures 4, 7:
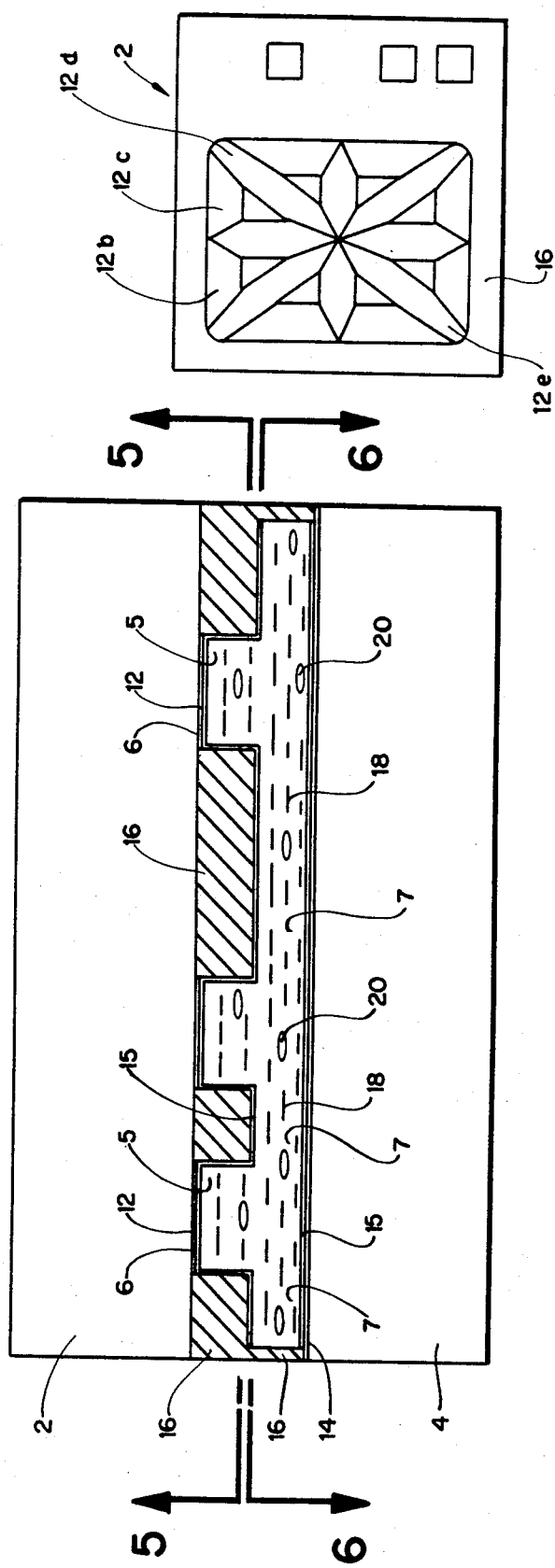
FIG. 4 is a cross-sectional view of the light field liquid crystal cell illustrating a second embodiment of the invention.
FIG. 7 is a front view of a light field background liquid crystal cell.

In the second embodiment of the invention, pattern layer 16 applied to the substrates is essentially clear. Layer 16 is formed of an electrically nonconducting material, is disposed in the space between substrates 2 and 4, as shown in FIG. 4, and forms a seal substantially around the periphery of the space leaving only a fill channel which extends through the seal. Layer 16 is applied to all areas of the inward surface of substrate 2 except electrode segment areas 6. The application of layer 16 thereon forms open regions across the spaces 5 formed between the electrode segment areas 6 and substrate 4, and forms thin background regions 7 between layer 16 and substrate 4. The thickness of regions 7 is substantially less than the thickness of the open regions across spaces 5. As a result of this different thickness, more liquid crystal, dye molecules 18 and 20 are contained in spaces 5 than regions 7, resulting in spaces 5 appearing darker than regions 7. The thickness of pattern layer 16 can vary so as to increase or decrease the difference in thickness and contrast between spaces 5 and regions 7. The contrast must be such that application of a predetermined voltage between electrodes 12 and 14 in a space 5 will cause the space to appear to be essentially the same color as the unenergized thin background region 7. Background regions 7 will appear as a light color, e.g., light blue while unenergized spaces 5 will appear as a darker color, e.g., dark blue. When the spaces 5 are energized, they will appear essentially the same light color as background regions 7. In this manner the characters are displayed on a lighter background. Once again, the unwanted segments are energized.

Means are provided for electrically energizing the electrode on the second substrate and for selectively energizing certain of the electrode segments on the first substrate, causing the liquid crystal and dye molecules to be oriented in a manner to substantially transmit light through the region between the energized electrodes. The means may be deposited conductive layers extending to the edge surface of one or the other substrate in a manner well known in the art.

It will be understood that the instant invention may be either a transmissive or reflective display cell. The use of polarizer elements is generally not utilized with the instant invention since the use of pleochroic dyes essentially eliminates the need for polarizers. However, polarizers may be used where increased contrast is desired for parallel director alignment.

As is apparent, the specific embodiments described herein may be altered and changed by one skilled in the art without departing from the true spirit and scope of the invention which is described in the appended claims.

What is claimed is:

1. A light field dark character liquid crystal display cell comprising:

first and second substrates formed of a transparent material, each of the substrates having inwardly facing surfaces arranged in coplanar relationship and spaced apart to provide a uniform space therebetween;

at least one transparent electrode formed on the inward facing surface of the second substrate;

a plurality of transparent electrode segments formed on the inward facing surface of the first substrate and facing the electrode on the second substrate;

a transparent clear seal and pattern layer formed of an electrically nonconducting material disposed in the space between the substrates, the pattern layer forming a seal substantially around the periphery of the space leaving only a fill channel therethrough, the pattern layer forming open regions across the space between the electrode segment areas and forming thin background regions between the layer and the inwardly facing surface of one of the substrates, the thickness of the thin background regions being substantially less than the thickness of the open regions across the space between the electrode segment areas;

a molecular director alignment layer deposited on at least the portions of the electrodes not sealed by the pattern layer;

a liquid crystal material and pleochroic dye mixture confined by the pattern layer between the two substrates, the molecular orientation of the liquid crystal material and pleochroic dye being substantially ordered by the director alignment layer in the unenergized states so that the molecules of liquid crystal and dye material in the open regions between unenergized electrodes absorb light, thereby presenting a dark colored appearance in such open regions, and the molecules of liquid crystal and dye material in the thin background regions partially absorb light thereby presenting a lighter background color in these regions of the cell; and means for electrically energizing the electrode on the second substrate and for selectively energizing certain of the segment electrodes on the first substrate causing the liquid crystal and dye molecules to be oriented in a manner to substantially transmit light through energized electrode segments, thereby producing a light color substantially the same as that of the thin background regions containing only a thin layer of unenergized liquid crystal and pleochroic dye molecules.

2. The light field liquid crystal display cell as defined in claim 1, wherein the electrode on the second substrate comprises a plurality of transparent conductive electrode segments.

3. The light field liquid crystal display cell as defined in claim 1, wherein the pattern layer comprises a pattern layer made of a polymeric material.

4. The light field liquid crystal display cell as defined in claim 1, wherein the alignment layer is applied to the inward surfaces of the first and second substrates, and the pattern layers applied thereto.

5. The light field liquid crystal display cell as defined in claim 1, wherein the liquid crystal material comprises a cholesteric doped nematic liquid crystal.

6. The light field liquid crystal display cell as defined in claim 1, wherein the liquid crystal material comprises a nematic liquid crystal.

7. The light field liquid crystal display cell as defined in claim 1, wherein the alignment layer is a surfactant for aligning the liquid crystal, dye molecules' director.

* * * * *